United States Patent
Carvallo et al.

(10) Patent No.: US 8,849,623 B2
(45) Date of Patent: Sep. 30, 2014

(54) SYSTEMS AND METHODS FOR RESERVOIR DEVELOPMENT AND MANAGEMENT OPTIMIZATION

(75) Inventors: Federico D. Carvallo, Sugarland, TX (US); Cassandra M. McZeal, Houston, TX (US); Anoop A. Mullur, Houston, TX (US); Vikas Goel, Houston, TX (US)

(73) Assignee: ExxonMobil Upstream Research Company, Houston, TX (US)

(*) Notice: Subject to any disclaimer, the term of this patent is extended or adjusted under 35 U.S.C. 154(b) by 624 days.

(21) Appl. No.: 13/131,793

(22) PCT Filed: Sep. 14, 2009

(86) PCT No.: PCT/US2009/056814
§ 371 (c)(1),
(2), (4) Date: May 27, 2011

(87) PCT Pub. No.: WO2010/071701
PCT Pub. Date: Jun. 24, 2010

(65) Prior Publication Data
US 2011/0238392 A1    Sep. 29, 2011

Related U.S. Application Data

(60) Provisional application No. 61/122,981, filed on Dec. 16, 2008.

(51) Int. Cl.
*G06F 7/60* (2006.01)
*G06F 17/10* (2006.01)
*E21B 43/00* (2006.01)
*G01V 99/00* (2009.01)

(52) U.S. Cl.
CPC ............... *E21B 43/00* (2013.01); *G01V 99/005* (2013.01); *G01V 2210/663* (2013.01)
USPC ............................................. 703/2; 703/10

(58) Field of Classification Search
CPC . E21B 43/00; G06F 17/5009; G06F 2217/16; G06F 17/5018; G01V 99/005
USPC ........................................................ 703/2, 10
See application file for complete search history.

(56) References Cited

U.S. PATENT DOCUMENTS 5,638,269 A    6/1997    Fournier et al.
(Continued)

FOREIGN PATENT DOCUMENTS

AU    2006/235884    11/2006
(Continued)

OTHER PUBLICATIONS

B.S. Yang, Y.S. Yeun, W.S. Ruy, "Managing approximation models in multiobjective optimization" Springer-Verlag 2002 Digital Object Identifier (DOI) 10.1007/s00158-002-0224-0; pp. 141-156.*

(Continued)

*Primary Examiner* — Dwin M Craig
(74) *Attorney, Agent, or Firm* — ExxonMobil Upstream Research Company Law Dept.

(57) ABSTRACT

Systems and methods which implement surrogate (e.g., approximation) models to systematically reduce the parameter space in an optimization problem are shown. In certain embodiments, rigorous (e.g., higher fidelity) models are implemented with respect to the reduced parameter space provided by use of surrogate models to efficiently and more rapidly arrive at an optimized solution. Accordingly, certain embodiments build surrogate models of an actual simulation, and systematically reduce the number of design parameters used in the actual simulation to solve optimization problems using the actual simulation. A multi-stage method that facilitates optimization of decisions related to development planning and reservoir management may be provided. Iterative processing may be implemented with respect to a multi-stage optimization method. There may be uncertainty in various parameters, such as in reservoir parameters, which is taken into account according to certain embodiments.

13 Claims, 4 Drawing Sheets

(56) References Cited

U.S. PATENT DOCUMENTS

| | | | |
|---|---|---|---|
| 6,002,985 | A | 12/1999 | Stephenson |
| 6,519,531 | B1 | 2/2003 | Batycky et al. |
| 6,549,854 | B1 | 4/2003 | Malinverno et al. |
| 6,618,695 | B1 | 9/2003 | Hu et al. |
| 6,662,109 | B2 | 12/2003 | Roggero et al. |
| 6,735,596 | B2 | 5/2004 | Corynen |
| 6,775,578 | B2 | 8/2004 | Couet et al. |
| 6,826,483 | B1 | 11/2004 | Anderson et al. |
| 6,901,391 | B2 | 5/2005 | Storm, Jr. et al. |
| 6,934,931 | B2 | 8/2005 | Plumer et al. |
| 6,980,940 | B1 | 12/2005 | Gurpinar et al. |
| 7,043,413 | B2 | 5/2006 | Ward et al. |
| 7,047,165 | B2 | 5/2006 | Balaven et al. |
| 7,054,752 | B2 | 5/2006 | Zabalza-Mezghani et al. |
| 7,069,148 | B2 | 6/2006 | Thambynayagam et al. |
| 7,089,167 | B2 | 8/2006 | Poe |
| 7,181,380 | B2 | 2/2007 | Dusterhoft et al. |
| 7,258,175 | B2 | 8/2007 | Veeningen et al. |
| 7,430,501 | B2 | 9/2008 | Feraille et al. |
| 7,478,024 | B2 | 1/2009 | Gurpinar et al. |
| 7,512,543 | B2 | 3/2009 | Raghuraman et al. |
| 7,546,228 | B2 | 6/2009 | Cullick et al. |
| 7,640,149 | B2 | 12/2009 | Rowen et al. |
| 7,788,074 | B2 | 8/2010 | Scheidt et al. |
| 7,835,893 | B2 | 11/2010 | Cullick et al. |
| 7,899,657 | B2 | 3/2011 | Martin |
| 8,352,226 | B2 | 1/2013 | Cullick et al. |
| 8,457,997 | B2 | 6/2013 | Narayanan et al. |
| 2003/0225606 | A1 | 12/2003 | Raghuraman et al. |
| 2004/0148147 | A1* | 7/2004 | Martin ............................ 703/10 |
| 2004/0220790 | A1 | 11/2004 | Cullick et al. |
| 2004/0220846 | A1 | 11/2004 | Cullick et al. |
| 2005/0096893 | A1 | 5/2005 | Feraille et al. |
| 2005/0119911 | A1 | 6/2005 | Ayan et al. |
| 2006/0047489 | A1* | 3/2006 | Scheidt et al. .................. 703/10 |
| 2006/0241867 | A1 | 10/2006 | Kuchuk et al. |
| 2007/0271077 | A1 | 11/2007 | Kosmala et al. |

FOREIGN PATENT DOCUMENTS

| | | |
|---|---|---|
| AU | 2006/235886 | 11/2006 |
| AU | 2006/235887 | 11/2006 |
| CA | 2 327 103 | 6/2007 |
| EP | 1 441 238 | 7/2004 |
| EP | 0 881 357 | 10/2004 |
| EP | 1 263 653 | 4/2006 |
| EP | 1263653 | 4/2006 |
| GB | 2 336 008 | 10/1999 |
| GB | 2 395 315 | 12/2004 |
| WO | 99/52048 | 10/1999 |
| WO | WO99/60247 | 11/1999 |
| WO | 02/18744 | 3/2002 |
| WO | 2004/046503 | 6/2004 |
| WO | WO2004/046503 | 6/2004 |
| WO | 2004/100040 | 11/2004 |
| WO | WO2004/010040 | 11/2004 |
| WO | WO2006/003118 | 1/2006 |
| WO | 2006/066166 | 6/2006 |
| WO | 2006/119099 | 11/2006 |
| WO | 2006/119119 | 11/2006 |
| WO | WO2006/119099 | 11/2006 |
| WO | WO2006/119119 | 11/2006 |
| WO | 2007/022352 | 2/2007 |

OTHER PUBLICATIONS

A. Castellini, I. Gullapalli, V. Hoang, P. Condon, "Quantifying Uncertainty in Production Forecast for Fields With Significant History: A West African Case Study", International Petrolium Technology Conference, IPTC 10987, 2005, pp. 1-5.*

H. Klie, W. Bangerth, X. Gai, M. F. Wheeler, P. L. Stoffa, M. Sen. M. Parashar, U. Catalyurek, J. Saltz, T. Kurc, "Models, methods and middleware for grid-enabled multiphysics oil reservoir management" Springer-Verlag London Limited 2006, pp. 22 pages.*

Alexandrov, N., Lewis, R.M., An Overview of First-Order Model Management for Engineering Optimization, Optimization and Engineering, vol. 2, pp. 413-430, 2001.

Barbaro, A., Bagajewicz, M. J., 2004, Managing Financial Risk in Planning Under Uncertainty, Aiche Journal 50 (5), 963-989.

Barnes, Richard J., et al., An Integrated Mathematical Programming Approach for the Design and Optimisation of Offshore Fields; Computers & Chemical Engineering 31 (5-6): 612-629 Sp. Iss. SI, May-Jun. 2007.

Carvalho, MCA, Pinto, JM, A Bilevel Decomposition Technique for the Optimal Planning of Offshore Platforms, Brazilian Journal of Chemical Engineering, 2006.

Goel, V., Grossmann, I. E., 2004, A Stochastic Programming Approach to Planning of Offshore Gas Field Developments Under Uncertainty in Reserves, Computers and Chemical Engineering 28 (8), 1409-1429.

Goel, V., Grossmann, I. E., 2005, A Novel Branch and Bound Algorithm for the Optimal Development of Gasfields Under Uncertainty in Reserves. Computers and Chemical Engineering 30 (6-7), 1076-1092 May 15, 2006.

Jonsbraten, T. W., 1998a, Oil Field Optimization Under Price Uncertainty, Journal of the Operational Research Society 49 (8), 811-818.

Jornsten, K. O., 1992, Sequencing Offshore Oil and Gas-Fields Under Uncertainty European Journal of Operational Research 58 (2), 191-201.

Myers, R.H., Montgomery, D.C., Response Surface Methodology, $2^{nd}$ Edition, Wiley Interscience, 2002.

Osterloh, W. Terry, Menard WP (Menard, Wendell P.); New Method Combines Simulation and Novel Spreadsheet Tools to Enable Direct Optimization of Expansion Decisions in a Giant Heavy-Oil Field; SPE Reservoir Evaluation & Engineering 10 (1): 35-42 Feb. 2007.

Roux, W.J., et al., Response Surface Approximations for Structural Optimization, International Journal for Numerical Methods in Engineering, vol. 42, pp. 517-534, 1998.

Sacks, J., et al., Design and Analysis of Computer Experiments, Statistical Science, vol. 4, pp. 409-423, 1989.

Simpson, T.W., et al., Metamodels for Computer-Based Engineering Design: Survey and Recommendations, Engineering With Computers, vol. 17, pp. 129-150, 2001.

Kosmidis, Vassileios D., et al., (2005), A Mixed Integer Optimization Formulation for The Well Scheduling Problem on Petroleum Fields, Computers & Chemical Engineering, vol. 29, No. 07, pp. 1523-1541.

Lin, Xiaoxia, et al., (2003), A Novel Continuous-Time Modeling and Optimization Framework for Well Platform Planning Problems, Optimization and Engineering, vol. 04, No. 1-2, pp. 65-95.

Neiro, Sergio M.S., et al., (2004), A General Modeling Framework for the Operational Planning of Petroleum Supply Chains, Computers & Chemical Engineering, vol. 28, No. 06-07, pp. 871-896.

Vasantharajan, S., et al., (2006), Applying Optimization Technology in Reservoir Management, The Journal of Petroleum Technology, vol. 58, No. 5, pp. 82-88.

Wan, Xiaotao, et al., (2005), Simulation-Based Optimization With Surrogate Models—Application to Supply Chain Management, Computers & Chemical Engineering, vol. 29, No. 06, pp. 1317-1328.

* cited by examiner

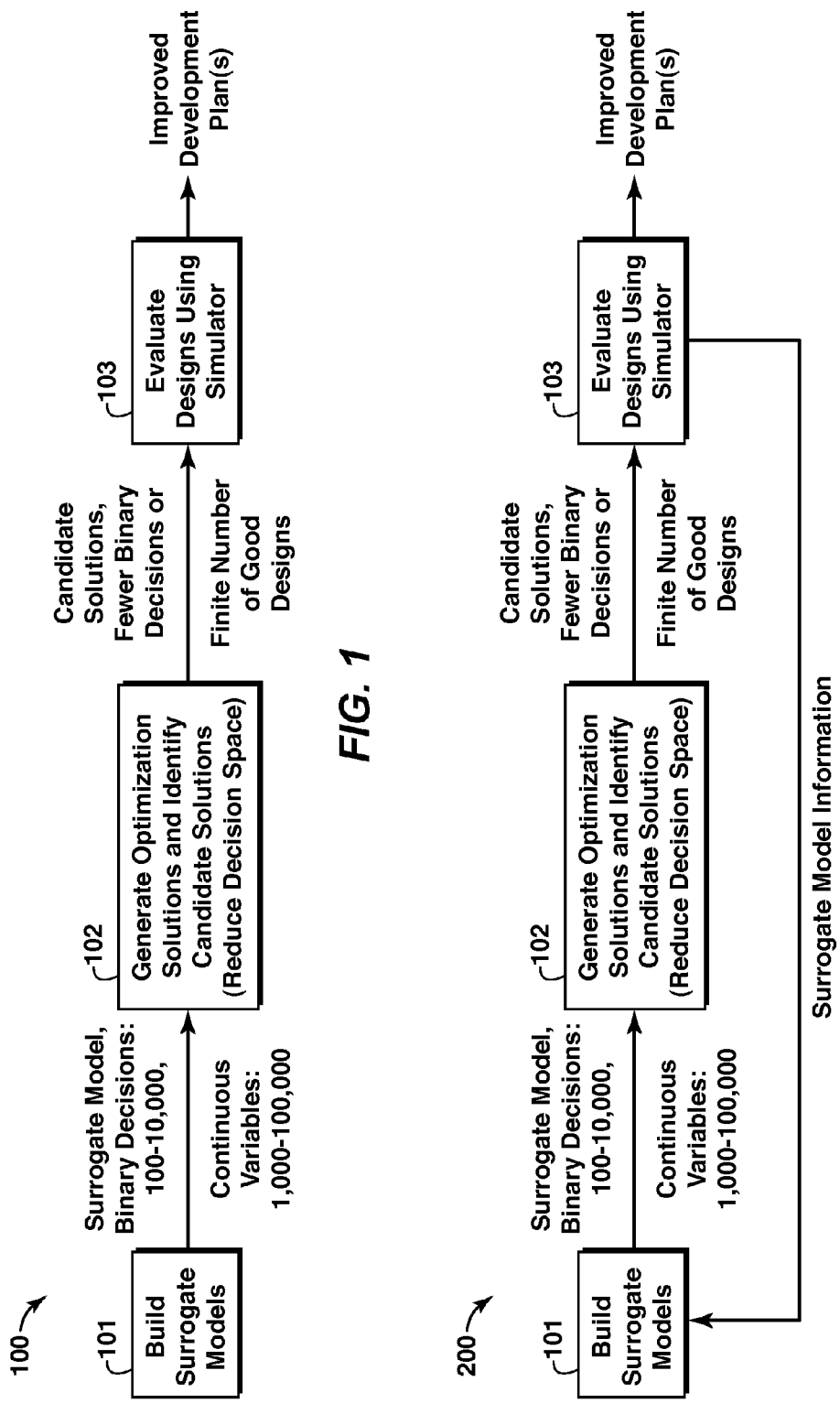

SYSTEMS AND METHODS FOR RESERVOIR DEVELOPMENT AND MANAGEMENT OPTIMIZATION

CROSS-REFERENCE TO RELATED APPLICATION

This application is the National Stage of International Application No. PCT/US2009/056814, that published as WO2010/071701, filed 24 Jun. 2010 which claims the benefit of U.S. Provisional Application No. 61/122,981, filed 16 Dec. 2008. The entirety of each of these applications is incorporated herein by reference for all purposes.

TECHNICAL FIELD

The present invention relates generally to reservoir development planning and/or reservoir management and, more particularly, to providing optimization with respect to development planning and/or management of reservoirs.

BACKGROUND OF THE INVENTION

Development and production of hydrocarbon resources (e.g., hydrocarbon reservoirs) used for oil and gas production is a highly capital intensive endeavor. Accordingly, there is great economic benefit in optimizing development and management plans for such hydrocarbon resources. However, effective development and management of hydrocarbon resources involves a large number of variables, decision points, and other parameters. For example, the development planning process for any particular reservoir often includes defining the optimal type, size, number, location, and timing of surface facilities and/or wells, how and when these facilities and/or wells should be connected, etc. The reservoir management process for any particular reservoir often includes planning optimal type, size, number, location, and timing of infill wells, determining injection and production rates at wells, etc.

Optimization of development plans and reservoir management plans is extremely difficult. In particular, the behavior of surface facilities, wells, and reservoirs themselves are represented by complex mathematical models that are solved using simulation. For example, reservoir simulators are used to model subsurface fluid flow through porous media, and thus typically include complex mathematical models representing subsurface network characteristics. For optimization processing, such simulations are embedded inside the optimization model, wherein the simulations are run for various different parameter selections to provide information with respect to the particular parameter selections providing the optimal results. For example, an optimization algorithm may invoke a simulation using selected parameter settings, analyze the simulation results, adjust the parameter settings, and again invoke the simulation.

The computational cost of solving the simulations in such optimization processing is significant. For example, an optimization problem for maximizing production may take on the order of one thousand simulations to identify the optimum parameter settings, where each simulation may require a day of computation.

Moreover, the development planning and reservoir management process typically spans a number of years, further increasing the computational costs associated with optimization processing. In particular, the parameters of such optimization problems involve a large number of decision variables (e.g., satisfying a number of hard and/or soft constraints), some of which are continuous decision variables while others may be chosen from a discrete set. The resulting optimization problems are therefore generally large scale, highly nonlinear, have continuous and integer variables, have expensive reservoir simulator models, and may have complex economics. Optimizing decisions in the development planning and/or reservoir management process with a reasonable degree of rigor is therefore highly challenging.

Several approaches have been taken by academia and industry to solve complex optimization problems. In particular, attempts have been made to solve optimization problems through the use of scenario studies, stochastic methods, and math programming methods.

In utilizing scenario studies for solving optimization problems, the user, based on prior experience and judgment, generates different combinations of optimization parameters to create several scenarios. All scenarios are evaluated, and based on the results, new scenarios may be created and evaluated. This process may continue until some criteria have been met. A disadvantage of this approach is that it relies on the user to create the scenarios. These scenarios may lead to poor results and may exclude several suitable or "good" solutions.

The use of stochastic methods (i.e., genetic algorithms, simulated annealing, tabu search) for solving optimization problems needs very little user involvement but require many function evaluations on even small problems. Function evaluations are generated randomly and are highly likely to exclude several good solutions. Moreover, stochastic methods are not typically desirable because of the large number of evaluations required.

Math programming (rigorous) methods for solving optimization problems use derivative (gradient) information to drive the simulator to an optimum. A disadvantage of this approach is that derivatives are typically not available. If derivatives are not available, a differentiable surrogate function could be used in place of the simulator. However, using surrogates alone may lead to solutions that are optimal from the context of the surrogate but infeasible or poor from the context of the simulator. Moreover, when solution time is critical, a rigorous approach using math programming methods may not be possible. A further impediment to using rigorous approaches is that a realistic (large) size problem cannot be solved using existing technology.

BRIEF SUMMARY OF THE INVENTION

The present invention is directed to systems and methods which implement surrogate (e.g., approximation) models to systematically reduce the parameter space in an optimization problem. In accordance with embodiments of the invention, rigorous (e.g., higher fidelity) models are implemented with respect to the reduced parameter space provided by use of surrogate models to thereby efficiently and more rapidly arrive at an optimized solution. Accordingly, embodiments of the invention build surrogate models of an actual simulation, and systematically reduce the number of design parameters used in the actual simulation in order to solve optimization problems using the actual simulation.

For example, concepts of the present invention may be applied with respect to optimizing one or more aspects (e.g., production, economics, etc.) of hydrocarbon resources (e.g., hydrocarbon reservoirs) through use of a surrogate model or models of a subsurface network, reservoirs, wells, facilities, etc. to identify a plurality of solutions which most nearly match the desired optimization criteria (referred to as candidate solutions). These candidate solutions are used to reduce the parameter space (i.e., reduce the number of variable parameters, reduce the variation of particular parameters, or otherwise reduce the variation associated with parameters used in the optimization problem) in the optimization problem, such as through recognizing parameters which are unchanged between different best surrogate solutions or which otherwise are shown to have an immaterial or insignificant impact upon an optimized solution. Thus, a rigorous model or models, which more closely model behaviors or other attributes of interest than do the surrogate models, is applied to efficiently arrive at an accurate and optimized solution according to embodiments of the invention.

Certain embodiments of the invention provide a multi-stage method that facilitates optimization of decisions related to development planning and reservoir management. A multi-stage method in accordance with the foregoing may involve building computationally less demanding, but reasonably accurate surrogate models that approximate various behavior (e.g., fluid flow inside reservoirs, wells, and surface facilities), using the surrogate models to optimize parameters involved in the development planning and/or reservoir management process and generate a set of candidate solutions, and evaluating the candidate solutions using rigorous models (e.g. simulators) to arrive at an optimal solution.

Iterative processing may be implemented with respect to a multi-stage optimization method according to certain embodiments. For example, a multi-stage optimization method may involve multiple surrogate model and rigorous model optimization runs. Surrogate models may be built using certain assumptions believed to provide reasonably accurate surrogate models and thereafter the surrogate models are used to optimize parameters involved in the development planning and/or reservoir management process and generate a set of candidate solutions, and the candidate solutions are evaluated using rigorous models to arrive at a putative optimal solution. The assumptions used in building the surrogate models may then be revised based upon the simulation using rigorous models, to thereby provide surrogate models at progressively higher levels of accuracy. The method may again be repeated using the improved surrogate models such that the optimal solution provided by the rigorous models is iteratively improved.

As a further example of iterative processing according to certain embodiments of the invention, surrogate models may be built with multiple levels of accuracy and computational complexity. Surrogate models at a first level of accuracy may be used to optimize parameters and generate a first set of optimization solutions. Thereafter, surrogate models at a second level of accuracy (e.g., surrogate models having increased accuracy) may be used to optimize parameters with respect to the first set of optimization solutions and generate a second set of optimization solutions, and so on. Such use of surrogate models having multiple levels of accuracy iteratively refines the optimization process leading to better solutions for that given level of accuracy in the surrogate models. A final set of candidate solutions for use in rigorous model simulation may be selected from a final, iteratively derived set of optimization solutions. Thereafter, the candidate solutions may be evaluated using rigorous models to arrive at an optimal solution.

It should be appreciated that the foregoing iterative techniques may be used alone or in combination. For example, certain embodiments of the invention may implement the foregoing iterative technique using surrogate models with multiple levels of accuracy to provide candidate solutions and the foregoing iterative technique using rigorous model simulation to refine the surrogate models to provide a highly accurate, yet computationally reasonable solution to optimization problems.

There may be uncertainty in various parameters, such as uncertainty in reservoir parameters, which is to be taken into account according to certain embodiments of the invention. Accordingly, certain embodiments of the invention include the effects of uncertainty in the optimization problem by constructing multiple resource simulation models (scenarios), wherein each model is associated a realization of an uncertain parameter, for example reservoir size. The uncertainty principles of such embodiments may be utilized in combination with various optimization techniques, such as the aforementioned iterative techniques.

In accordance with the above, certain embodiments use surrogate models of different numerical simulations (e.g., reservoir simulation, well simulation, facility simulation, economic simulation) for evaluating a development plan and/or reservoir management plan. Such surrogate models are used to reduce the original high-dimension mixed integer optimization problem to a lower-dimension optimization problem with more manageable dimension. This dimensional reduction allows a subsequent full-horizon optimization (i.e., over the entire simulation duration) which would otherwise be computationally infeasible. Thus embodiments of the invention lead to significantly improved development plans, compared to existing approaches, or approaches using heuristics alone, with lower computational cost. Moreover, certain embodiments of the invention implement surrogate model management, wherein surrogate models of varying levels of coarseness are generated, which allows improved control over the tradeoff between solution accuracy and computational cost.

The foregoing has outlined rather broadly features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIG. 1 shows a method adapted to provide optimization processing according to an embodiment of the invention;

FIGS. 2, 3, and 4 show methods adapted to provide optimization processing using iterative operation according to embodiments of the invention;

DETAILED DESCRIPTION OF THE INVENTION

Figure 3:
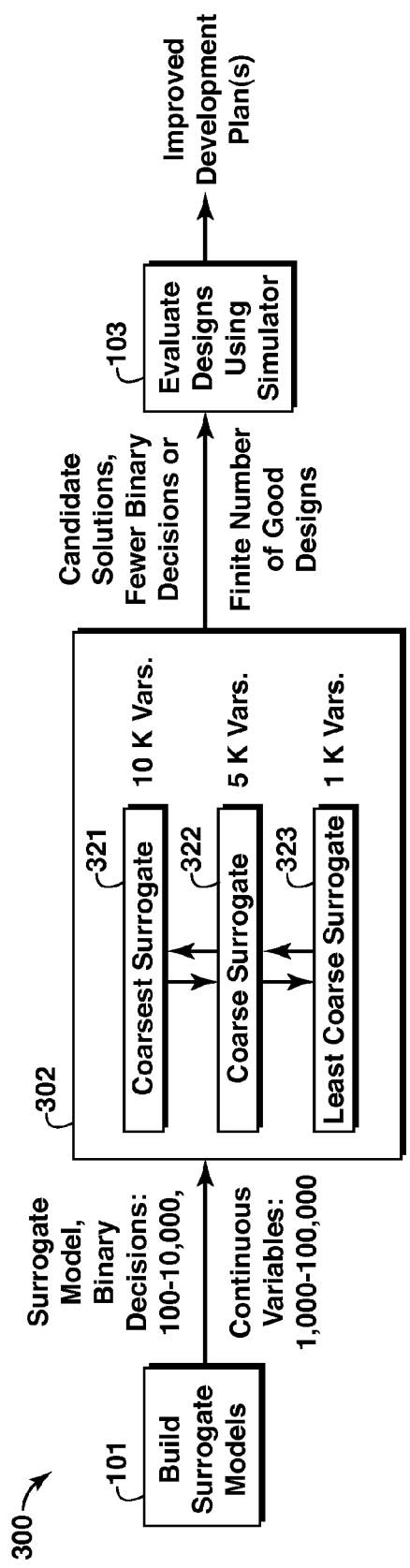

Some portions of the detailed description which follows are presented in terms of procedures, steps, logic blocks, processing and other symbolic representations of operations on data bits within a computer memory. These descriptions and representations are the means used by those skilled in the data processing arts to most effectively convey the substance of their work to others skilled in the art. In this detailed description, a procedure, step, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

Unless specifically stated otherwise as apparent from the following discussions, terms such as "providing", "reducing", "simulating", "applying", "using", "processing", "identify", "approximating", "capturing", "discretizing", "omitting", "refining", "repeating", "optimization", "modeling", "utilize", "captures", "constructing", or the like, may refer to the action and processes of a computer system, or similar electronic computing device, that manipulates and transforms data represented as physical quantities within the computer system's registers and memories into other data similarly represented as physical quantities within the computer system memories or registers or other such information storage, transmission or display devices. These and similar terms are to be associated with the appropriate physical quantities and are merely convenient labels applied to these quantities.

Embodiments of the invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A computer-readable medium includes any mechanism for storing or transmitting information in a form readable by a machine, such as a computer ('machine' and 'computer' are used synonymously herein). As a non-limiting example, a computer-readable medium may include a computer-readable storage medium (e.g., read only memory ("ROM"), random access memory ("RAM"), magnetic disk storage media, optical storage media, flash memory devices, etc.), and a computer-readable transmission medium (such as electrical, optical, acoustical or other form of propagated signals (e.g., carrier waves, infrared signals, digital signals, etc.)).

Furthermore, as will be apparent to one of ordinary skill in the relevant art, the modules, features, attributes, methodologies, and other aspects of the invention can be implemented as software, hardware, firmware or any combination thereof. Wherever a component of the invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the invention is not limited to implementation in any specific operating system or environment.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional blocks not shown herein. While the figures illustrate various actions occurring serially, it is to be appreciated that various actions could occur in series, substantially in parallel, and/or at substantially different points in time.

FIG. 1 shows multi-stage optimization method 100 according to certain embodiments of the invention. Operation in accordance with method 100 provides a systematic procedure to determine an optimal development plan and/or optimal management plan for resources (e.g., hydrocarbon reservoirs). In accordance with the foregoing, method 100 of the illustrated embodiment involves the use of one or more surrogate models to reduce the optimization parameter space by reducing/eliminating integer and discrete variables, and then performing full resource optimization modeling in the mostly continuous variable space. It should be appreciated that, although embodiments provide for determining optimal development and/or management plans, there is no limitation with respect to the concepts of the present invention providing "optimal" solutions. Accordingly, embodiments as described herein may be utilized to provide any desired solution, whether optimal or suboptimal.

Optimality with respect to such resources may be provided in terms of one or more quantifiable measures of merit, such as cumulative oil production, net present value (NPV) for hydrocarbon reservoirs, net production income, etc. A typical (deterministic) mathematical optimization problem involves the minimization (or maximization) of some objective function subject to a set of constraints on the problem variables. This topic is known as mathematical programming in the scientific and engineering community. Well known sub-categories of mathematical programming include linear programming (LP), mixed integer programming (MIP), nonlinear programming (NLP) and mixed-integer nonlinear programming (MINLP). A deterministic optimization model is typically posed in the following form in which an objective function $f$ is optimized subject to an array of constraint functions g that must be satisfied by setting the values of decision variable arrays x and y, as represented below.

$$\min f(x,y)$$
$$s.t.\ g(x,y) \leq 0 \quad (1)$$

The quality of a development plan or management plan can generally be assessed reasonably accurately by performing numerical simulations that predict resource behavior (e.g., reservoir behavior, well behavior, facility behavior, etc.) and economics. In providing optimization with respect to development plans and/or management plans according to certain embodiments of the invention, the problem may be cast as a mathematical optimization problem, where the behavior of the objective function and constraints is governed by numerical simulation models. Multi-stage optimization method 100 of the illustrated embodiment provides a practical solution procedure for such optimization problems, as further explained below.

To aid in understanding the concepts of the present invention, examples will be described herein with reference to resource development planning optimization, and particularly reservoir development planning optimization. It should be appreciated that the concepts of the present invention are applicable beyond the examples given. For example, the concepts of the present invention are applicable to resource management optimization, such as hydrocarbon reservoir management optimization. Likewise, the concepts of the present invention may be applied to any resources or phenomena which may be appropriately modeled, such as traffic flow, social interaction, building management, etc. Furthermore, the concepts herein may be applied in the presence of any or all of these types of numerical models: reservoir simulation, facility or well behavior, and economics models.

Optimization problem definitions, such as resource development planning optimization problem definitions, involve a large number of parameters. Such optimization parameters typically include continuous variables (e.g., pressures and rates). Additionally, such optimization parameters include variables whose values are selected from a discrete set (e.g., pre-determined facility sizes) and binary decision variables (e.g., existence of a specific facility, or a particular well being turned on or shut in), collectively referred to as integer variables. In hydrocarbon reservoir development planning, the number of integer variables is normally significantly less than the number of continuous variables. As the number of independent variables increases, so does the number of objective function and constraint evaluations for determining an optimum (or suboptimum) solution.

Numerical simulations, and in particular reservoir simulations, are typically computationally expensive. In solving optimization problems using simulations, the simulator and simulation models are invoked multiple times for different combinations of the values of the parameters. Where each such evaluation requires a computationally expensive numerical simulation (reservoir and/or others), the overall computational cost of solving the problem is often prohibitive. Operation of multi-stage optimization method 100 therefore provides for judicious selection of such parameters to thereby reduce the parameter space for rigorous model simulation, wherein rigorous models provide very close approximations to one or more modeled behavior or attribute (i.e., provide highly accurate simulation) and thus are associated with computationally expensive processing. That is, a subset of optimization solutions (e.g., those solutions that most closely meet one or more optimization criteria, and thus are "best" optimization solutions) to thereby reduce the number of parameters which are analyzed for optimization by a rigorous model (e.g., parameters that are the same or substantially the same across the subset of optimization solutions are presumed optimized), thereby providing an optimization problem to the simulator which have fewer optimization parameters (reduced parameter space).

Block 101 of method 100 addresses the challenge of a resource simulation, which uses rigorous models, being computationally expensive. To address this challenge, one or more surrogate models are built for use in the place of the actual full resource simulation.

Surrogate models of certain embodiments provide a numerical model that captures the behavior of a rigorous simulation model, but are less rigorous in at least one aspect so as to provide a model that is computationally inexpensive to evaluate. Additionally or alternatively, surrogate models may include coarsely discretized rigorous models (e.g., discretized at a coarser level of discretization than a corresponding rigorous model), models without certain computationally intensive physics (e.g., different physics omitted from surrogate models of the various levels), etc. Accordingly, a surrogate model is an approximation to a more detailed and rigorous model.

An example of a rigorous model includes large-scale simulators, such as are typically characterized by expensive function evaluations. A corresponding surrogate model may not model all aspects of such a rigorous model, may omit some aspect of a rigorous model all together, etc. For example, a surrogate model may include a second order polynomial representation of a modeled function for one or more design parameters such that, instead of providing an estimate for the function at every parameter combination, the surrogate model provides a few parameter combinations and assumes that the function behaves like a polynomial between these parameter combinations. Surrogate models utilized according to certain embodiments of the invention include only limited physics (or in some cases none) of the behavior of a modeled resource, such as a reservoir. Accordingly, a surrogate model is significantly cheaper computationally (e.g., several orders of magnitude) than the corresponding rigorous model (e.g., actual reservoir simulation), but this benefit comes at the cost of accuracy. However, surrogate models are nevertheless used effectively for optimization in the multi-stage framework of method 100.

There are various types of surrogate models that may be used according to embodiments of the invention. For example, such surrogate models may including type curves, reduced order models, non-physics based surrogates (such as polynomial functions, kriging), etc. Type curves may, for example, include data tables specifying production rates, gas oil ratio, and other quantities in each producing well as a function of percentage recovery factor or other state variables. Such type curves can be generated by running a full-physics simulation, from historical production data, etc. Type curves can be used in the place of the simulator for prediction, although the type curves should be updated (re-defined) if the prediction scenario is significantly different from the one used to generate the type curves. Non-physics based surrogate models and reduced order surrogate models can be generated, for example, by running one or more reservoir simulations with different combinations of the variable values.

The surrogate models built in block 101, along with optimization parameters (e.g., design parameters and optimization criteria for resource design optimization or management parameters and optimization criteria for resource management optimization), are provided as inputs at block 102 of the illustrated embodiment. It should be appreciated that the number of optimization parameters provided to block 102 is quite large, such as on the order of from 100 (or less) to 10,000 (or more) integer variables and from 1,000 (or less) to 100,000 (or more) continuous variables for hydrocarbon reservoir design optimization, in order to consider a large number of variations for optimization, and thus reduce the chances of omitting good or desired solutions to the optimization problem.

At block 102, optimization solutions are generated using the foregoing surrogate models and optimization parameters to reduce (e.g., by as much as an order of magnitude, such that on the order of from 100 to 1,000 integer variables and/or from 1,000 to 10,000 continuous variables remain for hydrocarbon reservoir design optimization) the optimization parameter space as provided to block 103. That is, operation in accordance with block 102 of the illustrated embodiment reduces the decision space (number of variables or the number of potential designs associated with the variables) of the optimization problem by eliminating solutions with poor objective function values. Accordingly, output of block 102 may be one or more optimization solutions (optimal or otherwise) to the optimization problem. For example, continuing with the hydrocarbon reservoir development optimization example, a optimization solution obtained at block 102 may represent a surface network in a development planning optimization problem. During processing in accordance with block 102 of the illustrated embodiment, the actual resource simulator is not invoked, but rather the surrogate model built in block 101 is used instead.

It should be appreciated that the accuracy of the surrogate models built in block 101 impacts the optimal solutions that are generated in block 102. Thus, although the computational cost of optimization processing of the surrogate models at block 102 is not significant, the solutions obtained may not be optimal from the context of the actual resource simulation. A benefit of optimization processing using the surrogate models is parameter space reduction. That is, by eliminating several potential optimization solutions (and consequently fixing the values of the corresponding variables), there remain a few candidate solutions to be assessed using the rigorous models of the actual resource simulation.

In generating optimization solutions at block 102 according to certain embodiments of the invention, the development planning problem or resource management problem may be formulated as a mixed integer nonlinear programming (MINLP) problem. Any known solution techniques may be employed to solve the MINLP. The solution to the MINLP is typically a single optimal integer solution, such as a solution representing an optimal reservoir network. However, by constraining the integer variables further (e.g., by adding integer cuts), alternative sub-optimal solutions to the MINLP can be generated, such as to provide solutions representing multiple reservoir networks.

Accordingly, the foregoing surrogate models are used in block 102 to optimize systems that are described by large-scale simulators by providing candidate optimization solutions based on the surrogate models with relatively little computing expense. For example, reservoir simulators are large, complex and require hours, or weeks for a single evaluation. However, in accordance with concepts of the present invention, such reservoir simulators are modeled with surrogates that take seconds to minutes for a single evaluation. Thus, even where hundreds or more evaluations are desired for an optimization problem to fully consider the possible optimal solutions, embodiments of the present invention provide robust optimization analysis with minimal computing cost.

In operation according to the illustrated embodiment, one or more optimization solutions generated at block 102 are assessed using rigorous models of a resource simulator at block 103. Thus some finite number of candidate solutions from block 102 are provided to block 103 for further optimization processing. The particular candidate solutions provided to block 103 for further optimization processing may be selected in a number of ways. For example, the solutions generated using the surrogate models at block 102 may be ranked by which most nearly match the desired optimization criteria, wherein some predetermined number of the solutions or the solutions providing optimization criteria within a predetermined threshold amount of the desired optimization criteria are selected for providing to block 103 as candidate solutions. The total number of candidate solutions to be assessed by block 103 may be limited by considerations such as the amount of computational resources available to run rigorous simulation models, the average time required to run each simulation, the time available to the decision-maker to make the decision, and the original problem dimension.

At block 103, the candidate solutions provided from block 102 are further evaluated using the rigorous models of an actual resource simulator. It should be appreciated that, because a number of solutions (e.g., non-optimal or otherwise poor solutions) have been eliminated from the candidate solutions, the optimization parameter space as utilized for further optimization processing is appreciably reduced. Accordingly, fewer designs or integer variables and continuous variables are provided as inputs at block 103 than were provided as inputs at block 102. That is, there are fewer optimization decisions because of the reduced optimization decision space and therefore the reduced optimization problem being solved at block 103 is simplified.

In operation according to the illustrated embodiment, each of the candidate solutions provided from block 102 represents a starting point for further optimization, albeit now over the reduced variable space. Block 103 operates to determine optimal values for the remaining variables of the optimization parameter space. It should be appreciated that the use of parallel computation can be beneficial in reducing the "wall clock" time utilized in assessing the candidate solutions.

The optimization of block 103 can be carried out in a plurality of ways, depending on the computational resources available. For example, rigorous model optimization processing may be performed using well management logic embedded inside a reservoir simulator, such as the ECLIPSE reservoir simulator available from Schlumberger Limited, the VIP reservoir simulation suite available from Halliburton Co., and other commercially available reservoir simulators. This optimization processing will optimize decisions within a time-step without emphasizing the trade-offs of decisions within the time-step and their effects on performance over the full time horizon. As another example, rigorous model optimization processing may be performed by coupling a reservoir simulator to an external optimization solver to perform a full-horizon optimization, using each of the candidate solutions as starting points. Examples of optimization solvers as may be utilized according to embodiments of the invention include GAMS DICOPT available from GAMS Development Corporation, AIMMS OUTER APPROXIMATION available from Paragon Decision Technology, SNOPT available from Stanford Business Software Inc., CPLEX available from ILOG, Inc., and BARON available from GAMES Development Corporation.

Using well management logic, as described above, involves manipulating facilities per time step during the course of the simulation. Typically, well management attempts to honor facility constraints, such as total liquid production rates, injection profiles etc. during the course of the simulation. The simulator then determines, at each time step, the well rates according to the well management strategy. Each of the candidate solutions may be evaluated using the same (or similar) well-management strategy in order to make a final comparison. A potential disadvantage of this approach is that it does not take into consideration the impact of decisions taken at time t on the simulation progress at time greater than t.

Using full-horizon optimization, as described above, involves performing the optimization external to the simulator using a gradient-based algorithm. A benefit of this approach over using well management logic is that the full-horizon optimization is likely to obtain a more improved development plan overall. However, this approach runs several reservoir simulations during the course of the optimization, leading to an increased computational cost. In accordance with certain embodiments of the invention, surrogate models built in block 101 may be combined with the reservoir simulations in order to alleviate the computational expense. As optimization processing progresses, the surrogate models may be re-calibrated (e.g., reconstructed by adding the new reservoir simulation design points obtained during the course of the optimization) to improve their accuracy.

If the candidate solutions are processed at block 103 using full-horizon optimization, a gradient-based optimizer may be utilized because of a large number of continuous variables. It may be beneficial to obtain first order/gradient information of the objective function with respect to the decision variables directly from the simulator (instead of finite differences). A simulator with adjoint capability will efficiently calculate such gradient information. Typically, the adjoint computation is independent of the number of variables, which leads to significant reduction in computational cost.

Optimization processing using one or more selected approaches, such as the aforementioned well management logic or full-horizon optimization, is carried out for each of the candidate solutions (e.g., surface networks) according to certain embodiments of the invention. The optimization solutions provided by such optimization processing is evaluated at block 103, such as based on the objective function values, to select an overall optimal solution. Accordingly, regardless of what optimization processing approaches is implemented, block 103 of the illustrated embodiment provides output of an optimized plan, such as may comprise a development plan or reservoir management plan that is optimal in some objective function from the context of the problem.

Although the foregoing example has been described as potentially progressing between various blocks of the illustrated embodiment without substantial user input or interaction, embodiments of the invention operate to be interactive so as to keep a user (e.g., reservoir engineer) within the decision-making loop, while assisting the user in moving towards an "optimal" solution (e.g., optimal development plan or optimal resource management plan). For example, during the course of such progress, method 100 of certain embodiments presents an array of "good" optimal solutions (e.g., solutions that are optimal in a physically meaningful manner) to the user, instead of a single solution that is optimal in a mathematical sense, for interactive decision making by the user.

Directing attention to FIG. 2, an alternative embodiment is shown wherein iterative processing is implemented as iterative multi-stage optimization method 200. Method 200 of the illustrated embodiment, although implementing optimization processing substantially as described above with respect to blocks 101-103, invokes multiple surrogate model and rigorous model optimization runs. Updating the surrogate models in accordance with method 200 will, in general, improve the quality of the surrogate models, and will consequently lead to more accurate solutions to the original optimization problem in subsequent iterations.

In operation according to method 200, the surrogate models built at block 101 may, for example, be built using certain assumptions believed to provide reasonably accurate surrogate models. However, optimization processing at block 103 using rigorous models for the candidate solutions provided by block 102 may reveal divergence or inaccuracies between the surrogate models and rigorous models. For example, comparison of the optimization solutions resulting from optimization processing using surrogate models at block 102 and the optimization solutions resulting from optimization processing using rigorous models at block 103 may provide information with respect to the assumptions used in building the surrogate models. This information is provided back to block 101 for refining or improving one or more aspect of a surrogate model according to the illustrated embodiment. The assumptions used in building the surrogate models may then be revised based upon the information fed back from the rigorous model simulation to thereby provide surrogate models at progressively higher levels of accuracy. Method 200 may again be repeated using the improved surrogate models such that the optimal solution provided by the rigorous model simulation at block 103 is iteratively improved.

FIG. 3 shows another alternative embodiment wherein iterative processing is implemented, here as iterative multi-stage optimization method 300. Optimization processing according to method 300 remains substantially as described above with respect to blocks 101 and 103. However, alternative embodiment block 302 has been provided in place of block 102. In operation according to the illustrated embodiment of method 300, surrogate models built at block 101 include surrogate models with multiple levels of accuracy and computational complexity. These surrogate models with multiple levels of accuracy and computational complexity are provided to block 302 of the illustrated embodiment for generation of optimization solutions.

Surrogate models having multiple levels of accuracy and computational complexity which may be utilized according to certain embodiments of the invention include lower order models than the rigorous models of the actual simulation model. For example, the foregoing surrogate models may include coarsely discretized reservoir simulation models (e.g., discretized at coarser levels of discretization), models without certain computationally intensive physics (e.g., different physics omitted from surrogate models of the various levels), etc. A coarse simulation model, which may be used as a surrogate model according to embodiments of the invention, is computationally less expensive than the actual simulation, and can be used in conjunction with the fine simulation model to reduce the overall computational cost. A benefit of using such a coarse simulation model instead of a mathematical function approximation is that some of the physics of the original simulation model is retained, potentially leading to higher accuracy.

Surrogate models at a first level of accuracy, such as coarsest surrogate model 321, may be used to optimize parameters and generate a first set of optimization solutions. Thereafter, surrogate models at a second level of accuracy, such as coarse surrogate model 322, may be used with respect to the first set of optimized solutions to generate a second set of optimized solutions. Thereafter, surrogate models at a third level of accuracy, such as least coarse surrogate model 323, may be used with respect to the second set of optimized solutions to generate a third set of optimized solutions. One or more candidate solution may be selected as described above from this third set of optimized solutions. The candidate solutions are provided to block 103 in the illustrated embodiment to be evaluated using rigorous models to arrive at an optimal solution, as discussed above.

It should be appreciated that, although three levels of surrogate models are shown in FIG. 3, there is no limitation with respect to the number of levels that may be utilized by embodiments of the invention. For example, an embodiment of the invention may utilize two or more levels of surrogate models in block 302, if desired.

In operation according to method 300, the coarsest surrogate model (least expensive) could be used to reduce the optimization parameter space by the largest amount, followed by the medium-coarse surrogate model, and so on. Thus, using multiple levels of surrogate models in any order can help achieve a balance between computational efficiency of solving the optimization problem and the degree of optimality of the final solution.

Figure 4:
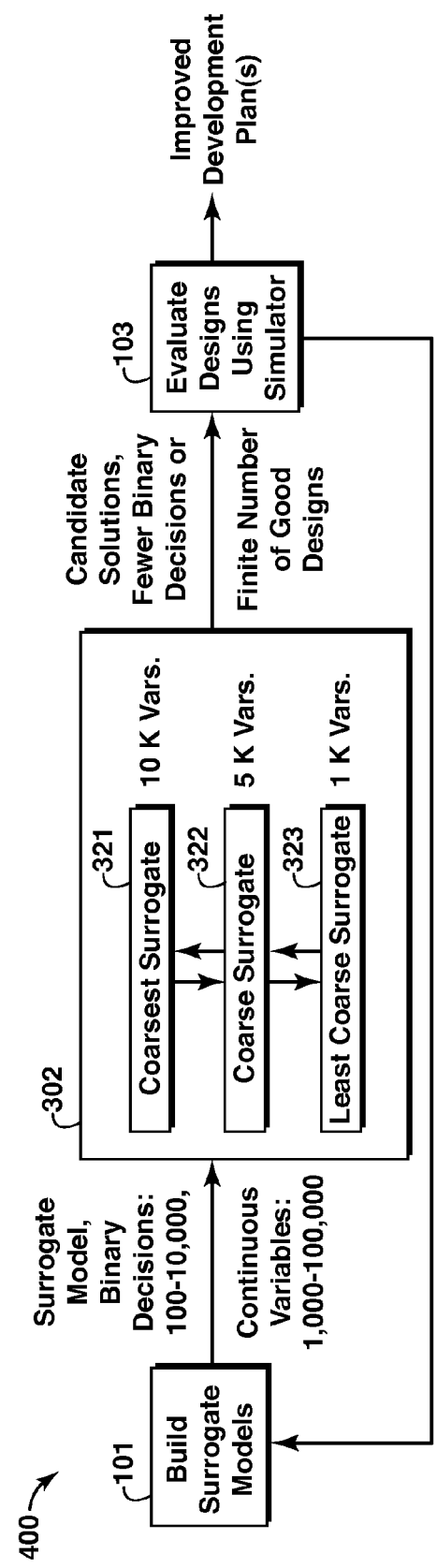

Certain embodiments of the invention implement the foregoing iterative techniques in combination. Directing attention to FIG. 4, the surrogate model information iterative feedback of the embodiment of FIG. 2 and the surrogate model multiple levels of accuracy iterative technique of FIG. 3 are combined to provide a highly accurate, yet computationally reasonable solution to optimization problems. In operation according to iterative multi-stage optimization method 400, a user or control algorithm may choose to update surrogate model information at block 101 and begin the next iteration at any surrogate level. Additionally, the user or control algorithm may choose to update a coarser surrogate model at block 302 before proceeding to block 103 during any particular iteration. This iterative process may continue until a termination condition is satisfied, for a specified number of iterations, etc.

Although embodiments have been described above with respect to solutions to deterministic optimization problems (i.e., the assumption is that the simulation model is deterministic in nature, and their values are known in advance), the concepts of the present invention are not limited to application to deterministic problems. There may be uncertainty in various parameters, such as uncertainty in reservoir parameters, which is to be taken into account according to embodiments of the invention. For example, uncertainty may be due to inadequate knowledge about the geological and reservoir properties, such as reservoir size, aquifer size, permeability distribution, etc. Accordingly, certain embodiments of the invention include the effects of uncertainty in the optimization problem.

Figure 5:
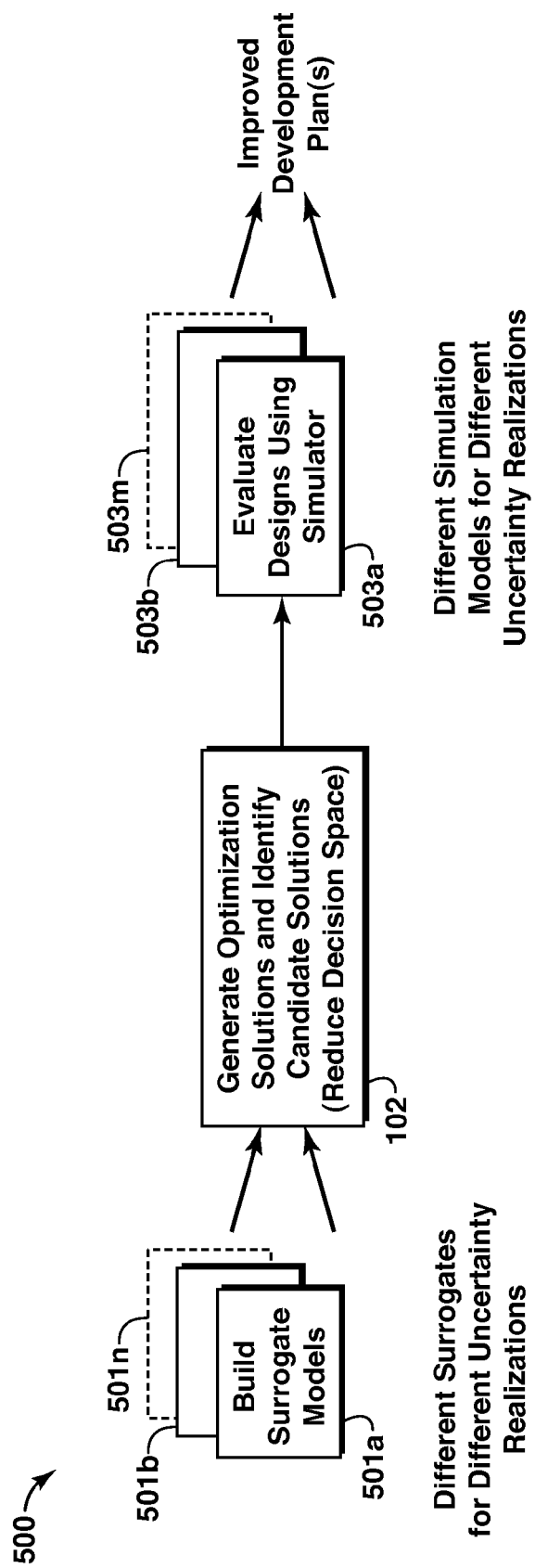
FIG. 5 shows a method adapted to provide optimization processing accommodating uncertainty according to an embodiment of the invention.

Directing attention to FIG. 5, uncertainty multi-stage optimization method 500 is shown. Method 500 of the illustrated embodiment represents uncertainty by constructing multiple resource simulation models (scenarios), wherein each model is associated a realization of an uncertain parameter, for example reservoir size. The values of each such realization may be provided using, for example, a probability distribution function assumed for the uncertain parameters.

Method 500 of the illustrated embodiment operates substantially as described above with respect to method 100 of FIG. 1, except that blocks 501a-501n build surrogate models for each scenario, block 102 generates optimization solutions for each of the surrogate models and identifies an appropriate set of candidate solutions, and blocks 503a-503m assess the candidate solutions generated at block 102 using rigorous models of a resource simulator for each scenario. In this case, the output will be a set of optimized solutions (e.g., a set of optimized development plans), one for each realization of the uncertain parameters. Incorporating uncertainty in this manner facilitates identification of optimal designs that are robust across some range of the uncertain parameters. Moreover, incorporating uncertainty as provided for in method 500 facilitates identifying which of the optimization parameters are most sensitive to variation in the uncertain parameters.

An alternative approach to providing uncertainty multi-stage optimization according to the concepts herein is to generate solutions in step 102 that are robust across all scenarios. This may be achieved by solving optimization problems at step 102 that maximize the probability weighted average profit (or other objective function) across al scenarios. Each of the candidate solutions identified may then be evaluated by running simulations for each scenario and computing the probability weighted average of the selected objective function.

Although shown with respect to a multi-stage optimization method similar to that of method 100 shown in FIG. 1, the uncertainty principles of method 500 may be utilized with respect to various optimization methods. For example, iterative uncertainty multi-stage optimization methods may be provided by combining the concepts set forth with respect to method 500 above with the embodiments of any of methods 200, 300, or 400 discussed above.

The functions described herein with respect to various embodiments of the invention may be implemented in hardware, software, firmware, and/or combinations thereof. When implemented in software, elements of the present invention are essentially the code segments to perform the tasks described herein. The program or code segments can be stored in a computer readable medium which may include any medium that can store or transfer information. Examples of a computer readable medium as may be utilized according to certain embodiments of the invention include an electronic circuit, a semiconductor memory device, a read only memory (ROM), a flash memory, an erasable ROM (EROM), a floppy diskette, a compact disk (CD), a CD-ROM, an optical disk, a hard disk, etc.

Certain embodiments of the invention may comprise a decision support system (DSS) software package for resource management and development planning. Such a DSS software package may allow the use of several specialized optimization models for specific development planning and/or reservoir management subproblems as well as allow customized optimization model development. Input data may be stored and retrieved preferably through a database or entered manually. Data input may include, but is not limited to, a complete reservoir simulation model or comparable reservoir description, simulators for modeling behavior of surface facilities and wells, an economics simulator or model, parameters required for surrogate generation, and option setting for the optimization routines. The DSS software may also allow the user to customize the optimization strategy used to address the development planning or reservoir management problem. Interfaces for surrogate generation may include selections for types of surrogates such as may include type curves, reduced order models, and non-physics based models.

The reduction of decision space (parameter space) as described herein by DSS software may allow the selection of a strategy for collecting and searching for as many "good" optimization solutions as possible, such as may include the addition of constraints that disallow previously discovered solutions. Once a set of candidate solutions are found they may be automatically used as input to the overall simulation model, such as may include reservoir, surface, well and/or economics simulators to optimize the remaining variables, preferably in parallel. Alternatively, a user can select one or more potential solutions for further investigation. The user may also select between time-step or full time horizon optimization according to certain embodiments. If full time horizon is chosen the user may also be presented with the option to reuse the generated surrogates. During this process the DSS software may display results as the solutions are found and allow the user to interact with the system. An example interaction may be to discontinue the optimization if threshold improvement is not achieved. Once the solution process is complete the DSS software may post process and display results for visualization and report generation.

Optimization models utilized according to certain embodiments of the invention may be implemented in a mathematical programming language, a system such as AIMMS, GAMS, AMPL, OPL, MOSEL, with a computer programming language such as C++ or JAVA, etc. A fit-for-purpose multistage approach in accordance with the concepts herein could also be developed for solving these models in either mathematical programming languages or directly with a computer programming language.

Reservoir, well and facility simulators which provide modeling of the movements of gas and/or liquid in hydrocarbon reservoirs, wells and surface facilities as well as economic simulators which evaluate economic performance of a project may be provided through numerical simulation algorithms according to embodiments of the invention. For example, commercial reservoir, well, facility and economic simulation software, such as ECLIPSE, VIP, fit for purpose economics models created in a spreadsheet application (e.g., EXCEL available from Microsoft Corp.) may be utilized according to certain embodiments.

Input data sources as may be utilized according to certain embodiment of the invention include spreadsheets and databases. Such data sources may be linked to the optimization model through computer programming languages, for example.

Non-physical surrogate models such as kriging and radial basis functions may be implemented in commercial software such as MATLAB. Such surrogate models may additionally or alternatively be implemented using programming languages such as FORTRAN and C++. Physical surrogate models may be derived from existing simulation models by reducing the resolution of these simulation models in terms of time-steps, spatial grid size or other model properties that significantly affect the computational performance of the simulations. Additionally or alternatively, such physical surrogate models may be based on alternative physical modeling of the relevant phenomena and implemented using a programming language such as FORTRAN or C++.

Figure 6:
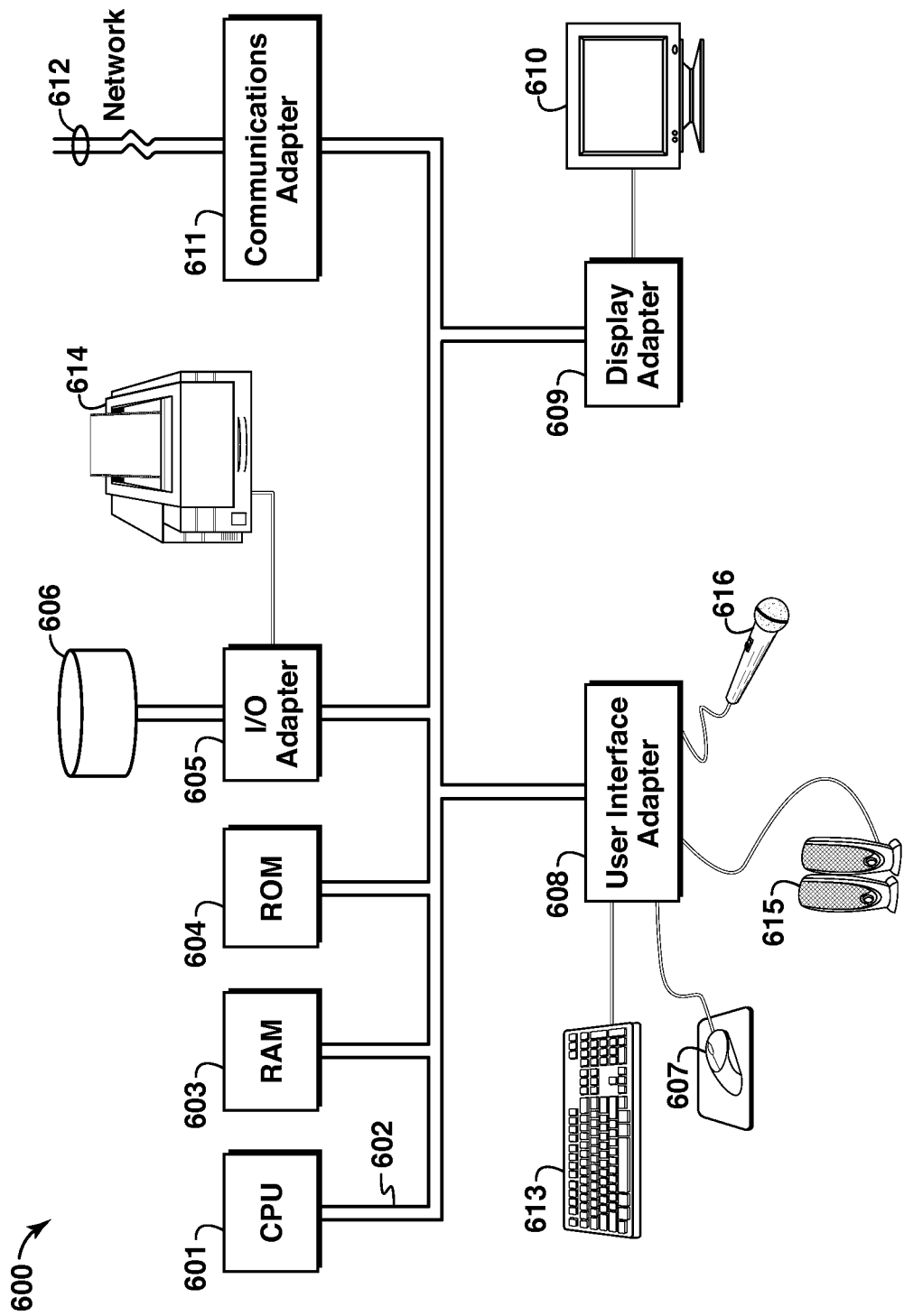
FIG. 6 shows a system adapted for use in accordance with embodiments of the invention.

FIG. 6 illustrates computer system 600 adapted for use in accordance with certain embodiments of the present invention, such as to perform any or all of the functions described above with respect to methods 100, 200, 300, 400, and 500. The illustrated embodiment of computer system 600 includes central processing unit (CPU) 601. CPU 600 may comprise one or more processors, such as processors from the PENTIUM family of processors available from Intel Corporation, processors from the POWERPC family of processors available from the AIM Alliance (Apple-IBM-Motorola), processors from the XEON family of processors available from Intel, etc. The present invention, however, is not restricted by the architecture of CPU 601 as long as CPU 601 supports the inventive operations as described herein.

CPU 601 of the illustrated embodiment is coupled to system bus 602. Bus 602 is coupled to random access memory (RAM) 603, which may be static RAM (SRAM), dynamic RAM (DRAM), synchronous DRAM (SDRAM), etc. Read only memory (ROM) 604, which may be programmable ROM (PROM), erasable PROM (EPROM), electrically erasable PROM (EEPROM), etc., is also coupled to bus 602. RAM 603 and ROM 604 store user and system data and programs as is well known in the art.

Bus 602 of the illustrated embodiment is also coupled to input/output (I/O) adapter 605, communications adapter 611, user interface adapter 608, and display adapter 609. I/O adapter 605 connects to storage devices 606, such as one or more of a hard drive, a CD drive, a floppy disk drive, a tape drive. I/O adapter 605 of the illustrated embodiment is also connected to printer 614, which allows computer system 600 to print information such as in the form of documents, reports, graphs, photographs, articles, etc. Note that printer 614 may be a traditional printer (e.g., inkjet, laser, etc.), a fax machine, a copy machine, and/or the like. Communications adapter 611 is adapted to couple computer system 600 to a network, such as network 612, which may be one or more of a telephone network, a local area network (LAN), a wide area network (WAN), a wireless network, the Internet, and/or the like. User interface adapter 608 of the illustrated embodiment couples user input devices, such as keyboard 613, pointing device 607, and microphone 616, to the computer system. User interface adapter 608 of the illustrated embodiment also provides sound output to a user via speaker(s) 615. Display adapter 609 is driven by CPU 601 to control the display on display device 610.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A non-transitory computer-implemented method comprising:
   providing an optimization parameter set, the optimization parameter set having a plurality of variables for accurate simulation of at least one behavior of interest relating to a hydrocarbon reservoir;
   reducing a number of optimization parameters in the optimization parameter set prior to applying a rigorous optimization model to thereby provide a reduced parameter space, wherein the optimization parameter set includes integer variables and continuous variables and wherein the optimization parameter set comprises from 100 to 10,000 integer variables and from 1,000 to 100,000 continuous variables, and wherein the reduced optimization parameter space comprises at least one of less than 1,000 proposed designs and from 10 to 1,000 integer variables and from 1,000 to 10,000 continuous variables;
   simulating in a computer the at least one behavior of interest for optimization processing using the rigorous optimization model over the reduced parameter space to provide an optimized solution for application to the behavior of interest; and
   outputting the optimized solution.

2. The method of claim 1, further comprising:
   predicting properties of the hydrocarbon reservoir using the optimized solution; and
   extracting hydrocarbons from the hydrocarbon reservoir based on the predicted properties of the hydrocarbon reservoir.

3. The method of claim 1, wherein the reducing a number of optimization parameters comprises:
   processing the optimization parameter set using a surrogate model to identify one or more candidate solution for the optimization processing, wherein the surrogate model comprises an approximation of the rigorous model.

4. The method of claim 3, wherein the surrogate model comprises a numerical model that captures the behavior of the rigorous model but is less rigorous in at least one aspect.

5. The method of claim 3, wherein the surrogate model comprises a coarsely discretized version of the rigorous model.

6. The method of claim 3, wherein the surrogate model comprises a version of the rigorous model having at least one aspect of physics modeling omitted.

7. The method of claim 3, further comprising:

providing feedback of information regarding the simulating the at least one behavior using the rigorous model;

refining the surrogate model to more closely approximate the rigorous model; and repeating the steps of reducing and simulating.

8. The method of claim 3, wherein the processing the optimization parameter set using the surrogate model comprises:

reducing the number of optimization parameters in the optimization parameter set using a first level of surrogate model to provide a first reduced number of optimized parameters; and reducing the first reduced number of optimized parameters using a second level of surrogate model.

9. The method of claim 8, wherein the first level of surrogate model comprises a coarsest surrogate model and the second level of surrogate model comprises a less coarse surrogate model.

10. The method of claim 1, wherein the behavior of interest comprises hydrocarbon reservoir response.

11. The method of claim 1, wherein the behavior of interest comprises hydrocarbon reservoir draining.

12. The method of claim 1, wherein the optimization processing provides optimization for hydrocarbon reservoir design planning.

13. The method of claim 1, wherein the optimization processing provides optimization for hydrocarbon reservoir management.

* * * * *